United States Patent [19]

Arndt

[11] 4,008,920
[45] Feb. 22, 1977

[54] SEAT BACK ADJUSTER
[75] Inventor: O. Harold Arndt, Milwaukee, Wis.
[73] Assignee: UOP Inc., Des Plaines, Ill.
[22] Filed: Feb. 23, 1976
[21] Appl. No.: 660,550
[52] U.S. Cl. .............................. 297/361; 248/397
[51] Int. Cl.² .................... B60N 1/06; A47C 1/026
[58] Field of Search .......... 297/361, 355, 354, 313, 297/319, 326, 328, 366, 374, 378, 379; 248/371, 397; 108/6, 7

[56] References Cited
UNITED STATES PATENTS

| 2,635,679 | 4/1953 | McDonald | 297/378 X |
| 2,712,346 | 7/1955 | Sprinkle | 297/319 X |
| 3,441,313 | 4/1969 | Persson | 297/374 |

FOREIGN PATENTS OR APPLICATIONS

| 1,288,793 | 2/1962 | France | 297/379 |
| 1,404,666 | 2/1969 | Germany | 297/355 |
| 2,346,073 | 4/1974 | Germany | 297/355 |
| 1,165,118 | 9/1969 | United Kingdom | 297/326 |

Primary Examiner—Ramon S. Britts
Assistant Examiner—William E. Lyddane
Attorney, Agent, or Firm—James R. Hoatson, Jr.; Barry L. Clark; William H. Page, II

[57] ABSTRACT

Adjustment mechanism for tilting a vehicle seat back member which is pivotally attached to a seat frame. The adjuster includes a pair of axially spaced eccentric cams which can be incrementally rotated in channels in a pair of support members carried by the seat back. The cams which are mounted on a rod carried by the seat base, are rotated by a pull out knob which carries a pair of spaced pins which are adapted to snap, under the force of a spring, into a circle of apertures in the seat frame to lock the back in a selected position of adjustment.

8 Claims, 5 Drawing Figures

SEAT BACK ADJUSTER

BACKGROUND OF THE INVENTION

This invention relates to seats and particularly to seats used in applications where the seat is subjected to vibrations such as in heavy trucks and off-highway construction equipment. In such equipment, the driver's seat is generally suspended for isolation of vibrations. To provide additional comfort, it is often desirable that the seat back be capable of being tilted over a small range, such as about 15°. One widely used adjuster mechanism incorporates gears and relies on the gear ratio and friction to maintain a desired seat back angle adjustment. Although such a mechanism works well in light trucks and vans, it is unsuitable for heavy duty vehicles where vibration can cause rotation of the gearing and movement of the seat back. The gear type adjuster mechanism also requires substantial effort on the part of the seat occupant to rotate its parts against their inherent friction. Furthermore, several turns of the adjuster knob are needed to provide a 15° seat back angle adjustment.

It is among the objects of the present invention to provide a seat back adjuster mechanism which provides positive locking, requires little force to operate, is simple and economical to manufacture, and can be moved throughout its range of adjustment with a single twist of the operator's wrist.

SUMMARY OF THE INVENTION

The preceding objects are accomplished by the adjuster mechanism of the present invention which utilizes a pair of cams in the form of eccentric circular discs to pivot a pair of back carrying angle members about a pivot rod which is supported by the seat base frame. The cams are mounted on a hexagonal shaped rod which has a manually operated adjustment knob located at one end. The knob includes a pair of diametrically opposed locking pins which normally engage one or another pair of opposed holes in a circle of holes located in the seat base frame to lock the rod and cams against rotation. The knob is spring biassed so that it can be pulled axially outwardly on the rod a sufficient distance to disengage the pins from the holes. In this outward position it can be easily rotated over about a 180° range to rotate the cams and cause the seat back to assume any one of about 10 positions in its approximately 15° range of adjustment. Very little effort is required to rotate the knob to tilt the seat back since the locking mechanism is not an integral portion of the tilt mechanism. Thus, the seat occupant can readily move the back to any position in its adjustment range with a slight twist of his wrist.

DETAILED DESCRIPTION

Figure 1:
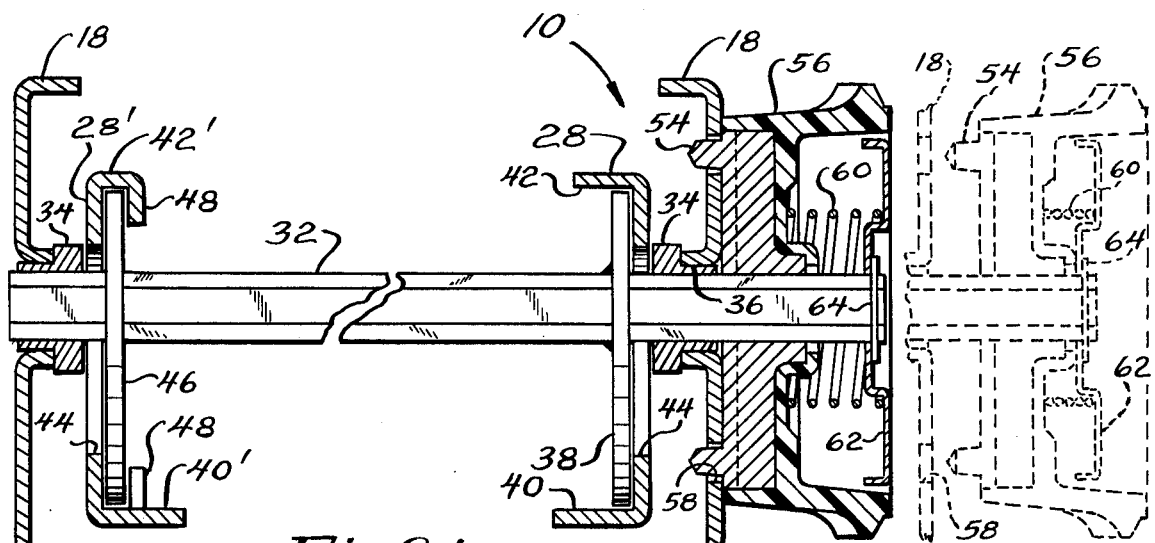
FIG. 1 is a top sectional view of the tilting and locking mechanism taken on line I—I of FIG. 3.
Figure 2:
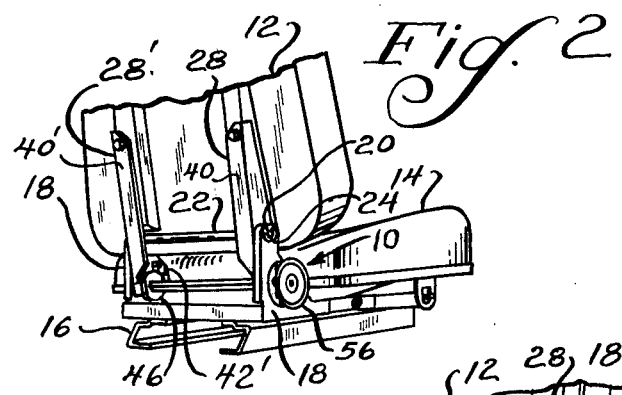
FIG. 2 is a fragmentary rear perspective view of a seat incorporating the invention.
Figures 3, 4:
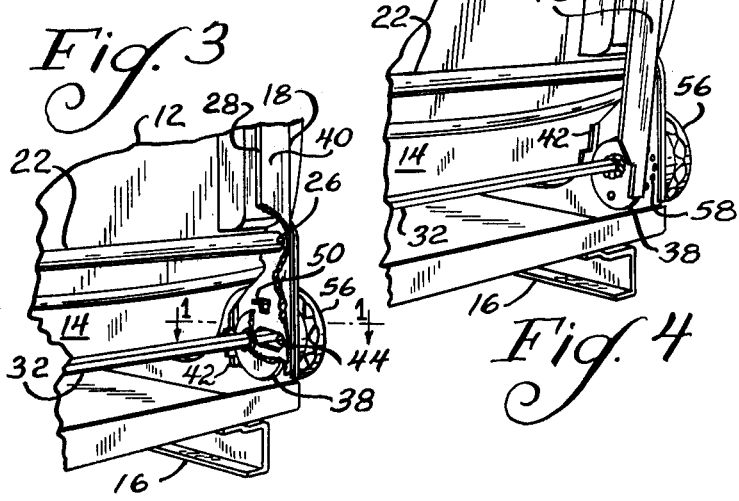
FIGS. 3 through 5 are fragmentary rear perspective views showing a seat back incorporating the invention in various positions of forward to rear adjustment.
Figure 5:
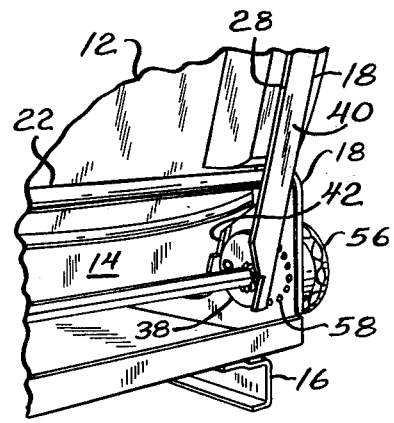

FIG. 1 shows a detailed cross-section of my improved seat adjusting mechanism 10 while FIG. 2 shows the relationship of the seat adjuster 10 to a seat consisting of a seat back 12, a seat cushion 14 and a seat frame 16. The seat frame 16 includes a pair of upwardly extending rear mounting portions 18 which include a first aperture 20 in which a pivot rod 22 is mounted and retained by E-rings 24. The pivot rod 22 also passes through a first aperture 26 (FIG. 3) in each of a pair of angle members 28, 28' which are rigidly attached to the seat back 12. Referring to FIG. 2, one can see that the seat back member 12 can be tilted back and forth relative to the seat cushion 14 about the pivot rod 22. The amount of pivotal movement which can take place is controlled by adjuster mechanism 10 which, as seen in FIG. 1, includes a hexagonal rod member 32 mounted in bearings 34 in second apertures 36 formed in the rear mounting portions 18 of the frame 16. A circular disc 38 is welded to the hexagonal rod 32 so that two diametrically opposed portions of the disc will be spaced from the rod 32 by different amounts as shown in FIG. 4 to provide an eccentric peripheral cam surface. The outer peripheral cam surface of the cam disc 38 simultaneously engages both the rear wall portion 40 and the front wall portion 42 which form a channel or guide track in the angle member 28 which is rigidly attached to the seat back 12. An elongated slot 44 (FIG. 3) formed in the pivotable angle member 28 permits the seat back 12 to tilt forwardly and backwardly about the pivot rod 22 without interfering with the hexagonal rod 32. A second circular disc 46 which is identical to the disc 38 is mounted for keyed sliding movement on the left end of the shaft 32 but is restrained against axial movement by bent over tab portions 48 of the rear and front wall portions 40', 42' of lefthand angle member 28'. A stop tab portion 50 is also struck out of the material of each of the angles 28, 28'. The stop tab 50 engages the outer periphery of the cam discs 38, 46 and limits the rotation of the discs and also the degree of tilt of the seat back 12. As seen in FIGS. 3–5, a rotation of the cam disc 38 over an approximately 180° range will cause the seat back 12 to progressively pivot about pivot rod 22 from its forwardmost to its rearwardmost position of adjustment. The seat back is positively retained in any one of about 10 positions of adjustment throughout this range by means of a pair of locking pins 54 which are carried by knob 56 and are adapted to engage in any pair of diametrically opposed apertures 58 in the circle of such apertures formed in the rear portion 18 of the frame 16.

In operation, the knob 56 is pulled axially outwardly by the seat occupant against the force of spring 60 as shown in dotted lines in FIG. 1. Once the locking pins 54 are clear of the frame portion 18 the knob 56 can be very easily rotated over a 180° range to cause a simultaneous rotation of the cams 38, 46 and a consequent pivoting of the angles 28, 28' and tilting of the seat back 12. Once a desired adjustment position has been reached, the operator merely releases the knob 56 and the spring 60 will cause the pins 54 to engage in one of the opposed pairs of holes 58. The spring 60 is retained between the interior portion of the knob 56 and a cover plate 62 while the cover plate 62 is retained on the hexagonal rod 32 by means of an E-ring 64.

From the preceding description one can see that my improved seat adjusting mechanism is very simple and provides a positive locking of the seat back in any of its positions of adjustment with a minimum of effort on the part of the seat occupant.

I claim as my invention:

1. An adjustment mechanism for locking a seat back in various positions of adjustment comprising a seat base; first and second spaced apart apertures in each side of the seat base; a pair of spaced apart support members adapted to support a seat back, said support members having a body portion with a pair of opposed side wall portions extending laterally there from; first and second spaced apart apertures in each of said support members said second apertures in each of said support members being elongated; pivot means passing through said first apertures in each side of said seat base and through said first apertures in said pair of support members for pivotally mounting said pair of support members relative to said seat base; a cam support rod pivotally mounted in said second apertures in each side of said seat base; said cam support rod passing through said elongated second apertures in said support members; a pair of spaced apart eccentric cams mounted on said cam support rod, each of said pair of cams lying between and being in peripheral engagement with said pair of opposed side wall portions on each of said pair of support members; an adjustment knob mounted on said cam support rod; spring means for biassing said adjustment knob toward said seat base and locking means on said adjustment knob and seat base for locking said adjustment knob and cam support rod against relative movement relative to said seat base, said adjustment knob being manually movable away from said seat base so as to disengage said locking means and permit said cams to be rotated to pivot said support members about said pivot means.

2. An adjustment mechanism in accordance with claim 1 wherein said adjustment knob is spring biassed toward said seat base.

3. An adjustment mechanism in accordance with claim 1 wherein said locking means comprises at least one pin on one of said seat base and adjustment knob elements and a series of holes in the other of said seat base and adjustment knob elements.

4. An adjustment mechanism in accordance with claim 3 wherein said locking means comprises a pair of locking pins on said adjustment knob and a circle of spaced holes in said seat base which are adapted to engage said pins in a plurality of rotary positions of said adjustment knob.

5. An adjustment mechanism in accordance with claim 1 wherein said cams comprise circular discs which are eccentrically positioned on said cam support rod and retained against rotation relative to said cam support rod.

6. An adjustment mechanism in accordance with claim 5 wherein said cam support rod has a polygonal shape.

7. An adjustment mechanism in accordance with claim 1 wherein said support members are angles and said opposed side wall portions are formed by a channel portion for peripherally engaging diametrically opposed portions of said cams.

8. An adjustment mechanism in accordance with claim 7 wherein each of said support members further includes a stop portion for limiting the rotary movement of said cams.

* * * * *